Sept. 15, 1931.  A. J. GILARDI  1,823,267
LAWN MOWER
Filed Dec. 15, 1928   3 Sheets-Sheet 1
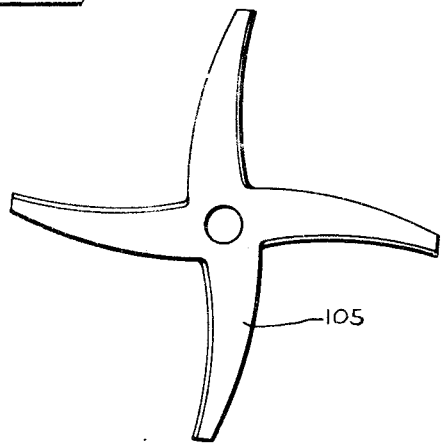
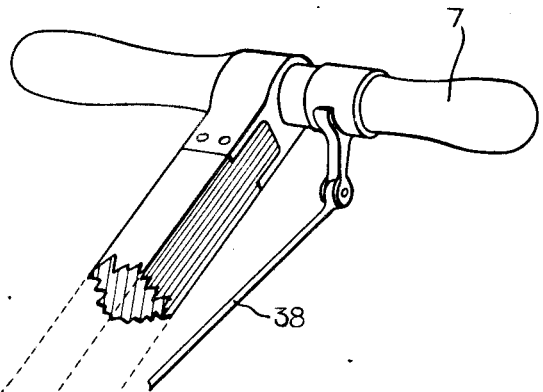
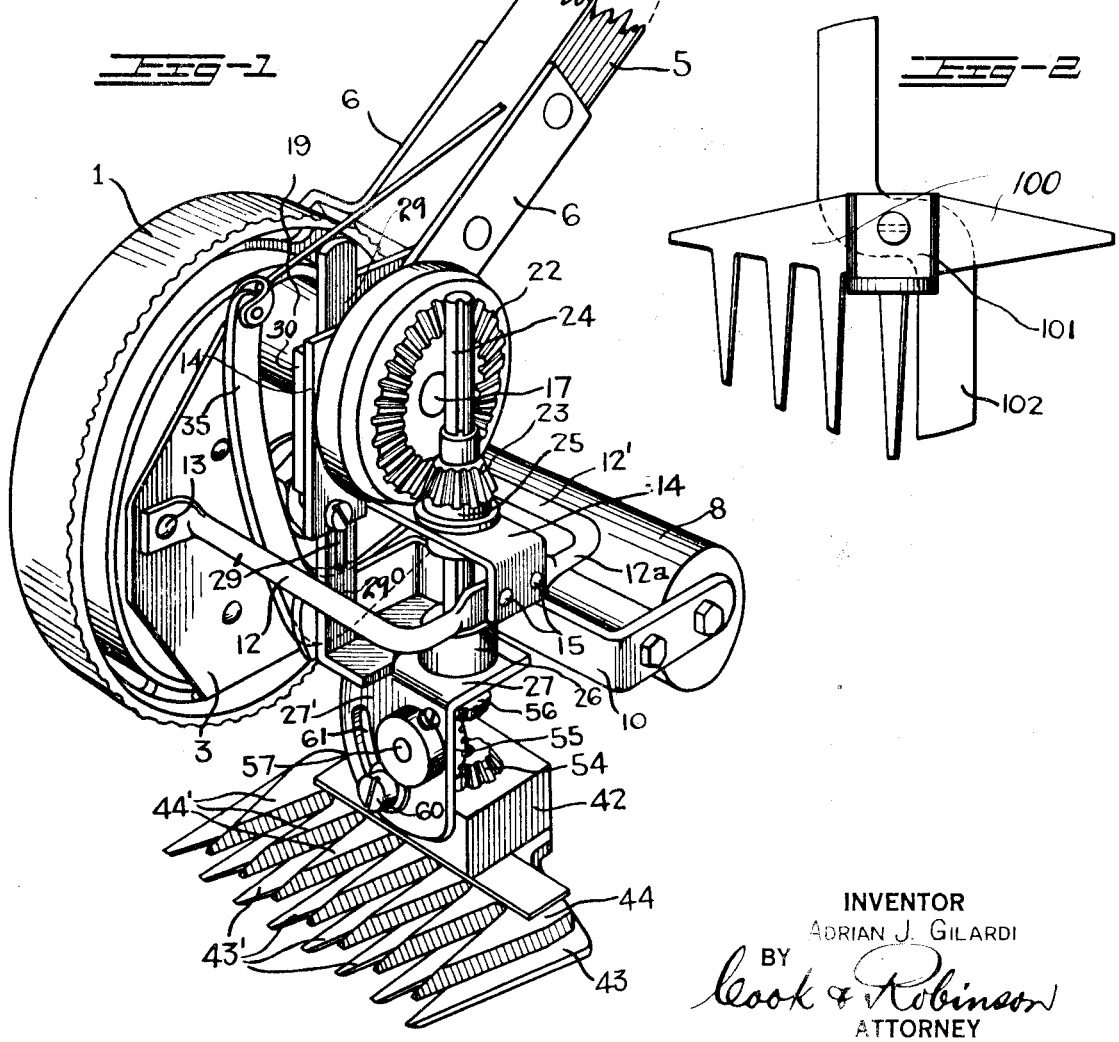
INVENTOR
ADRIAN J. GILARDI
BY
Cook & Robinson
ATTORNEY Sept. 15, 1931.  A. J. GILARDI  1,823,267
LAWN MOWER
Filed Dec. 15, 1928  3 Sheets-Sheet 2
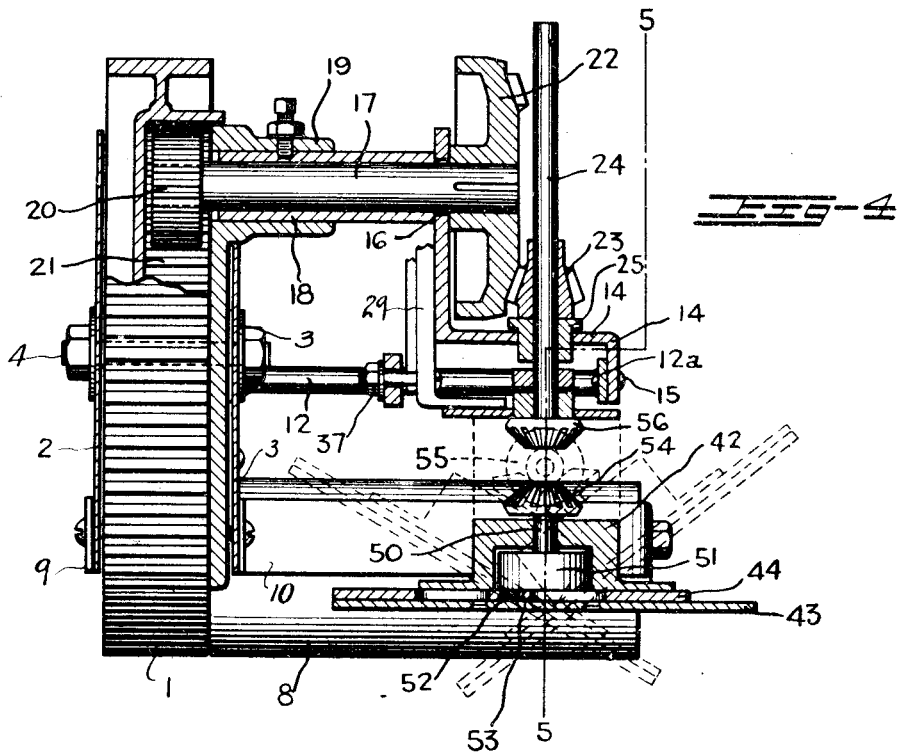
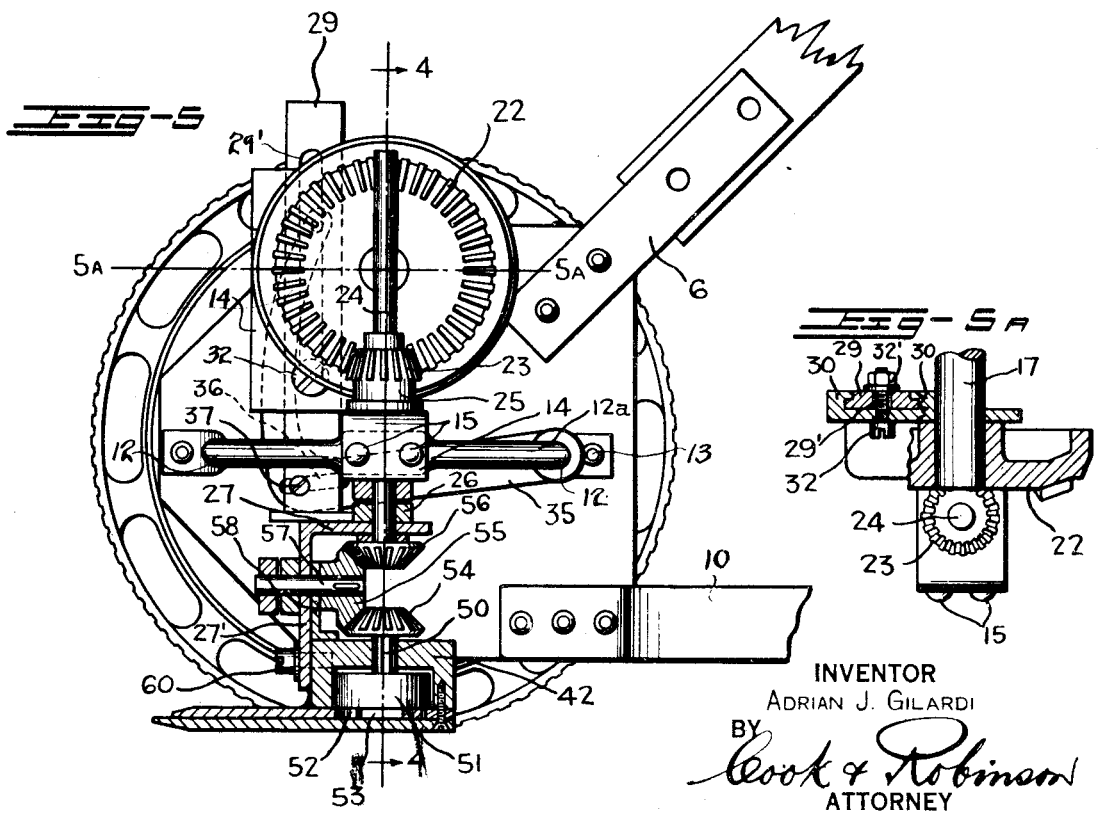
INVENTOR
ADRIAN J. GILARDI
BY
Cook & Robinson
ATTORNEY

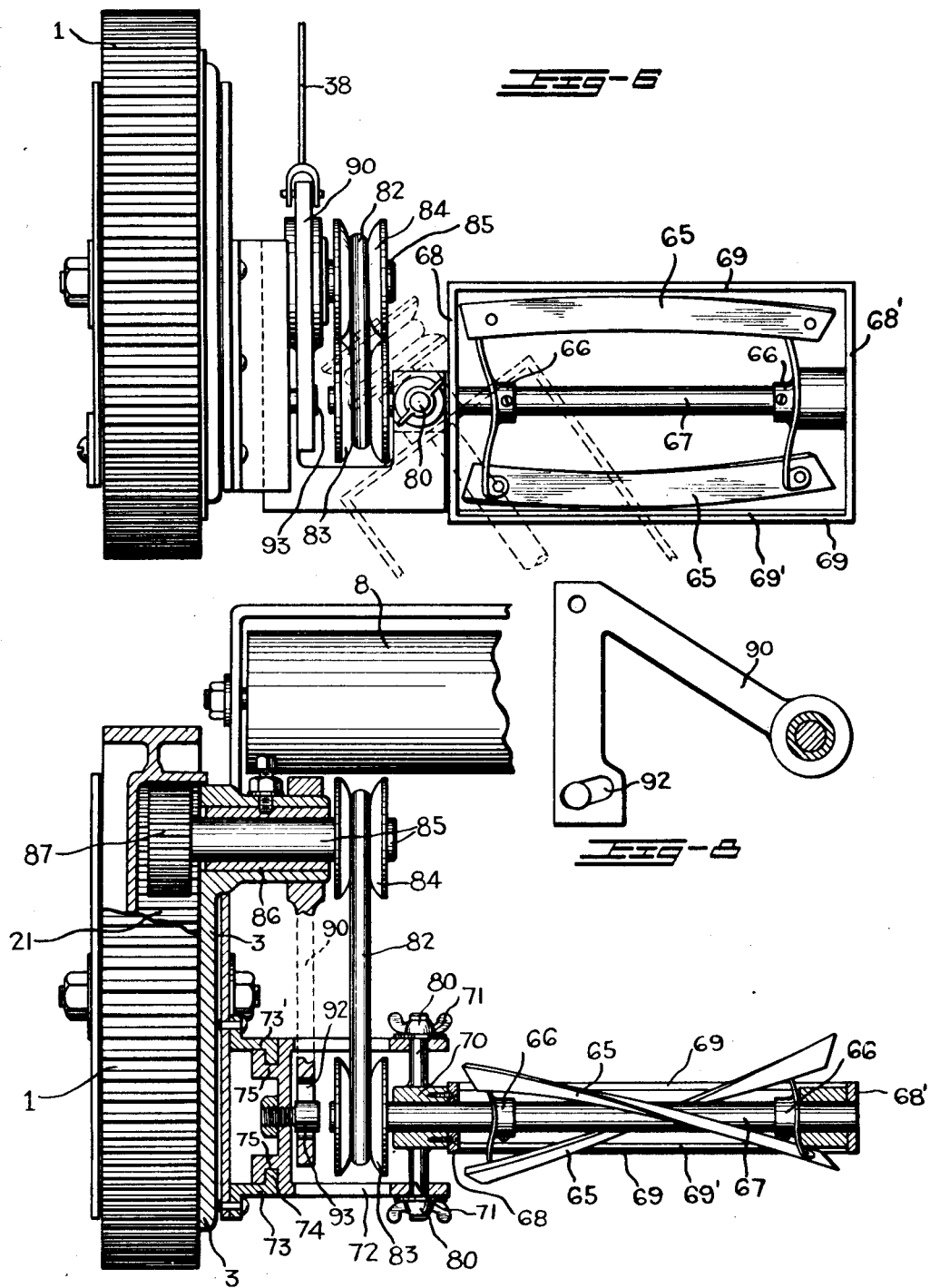

Patented Sept. 15, 1931

1,823,267

UNITED STATES PATENT OFFICE

ADRIAN J. GILARDI, OF SEATTLE, WASHINGTON

LAWN MOWER

Application filed December 15, 1928. Serial No. 326,294.

This invention relates to improvements in lawn trimmers and has particular reference to manually operated mowers of the one wheeled type that are designed for trimming closely along sidewalks, fences, trees, shrubs or plants where the ordinary type of two wheeled mower is not of service.

The principal object of the present invention is to provide an improved mower of the above character, wherein the cutter is adjustable vertically with respect to the driving or ground engaging wheel of the mower so as to permit cutting at various depths and is also tiltable in opposite directions to various angles between the horizontal and the vertical so as to make possible the trimming of grass closely along a walk or path where a substantially vertical cut is desired.

It is also an object of the invention to provide a cutter of the reciprocating type, which maintains its operative connection with the driving means for all positions of adjustment and which may be adjusted vertically at will and while the mower is in use by means of a connection with the handle of the mower.

Other objects of the invention reside in the various details of construction and in their mode of combination of parts and in their mode of operation as will hereinafter be described.

In accomplishing the objects of the invention, I have provided the improved details of construction, the preferred forms of which are illustrated in the accompanying drawings, wherein—

Figure 1 is a perspective view of a lawn mower of a preferred form of construction, embodying the present invention and illustrating the reciprocating form of cutter.

Figure 2 is a plan view of a cutter and guard therefor, of an alternative form of construction.

Figure 3 is another alternative form of cutter.

Figure 4 is a sectional detail of the mower, taken substantially on the line 4—4 in Figure 5.

Figure 5 is a view taken substantially on the line 5—5 in Figure 4.

Figure 5a is a detail section on line 5a—5a in Figure 5.

Figure 6 is a front view of a mower of an alternative form of construction, using a revolving cutter, parts of the mechanism being shown in section for better illustration.

Figure 7 is a plan view of the same, partly in section for better illustration.

Figure 8 is a detail view of the cutter adjusting bell crank as applied to the device of Figures 6 and 7.

Referring more in detail to the drawings—
1 designates the ground wheel of the mower. This may be of the usual construction and rotatably mounted between opposite face plates 2 and 3 held in functional relation thereto by a connecting bolt 4 that extends coaxially through the wheel. An upwardly inclined pole 5, by means of which the mower may be propelled, is rigidly attached to the plates 2 and 3 by means of straps 6 and a handle bar 7 is fixed to the upper end of the pole and this, for a purpose presently apparent, is rotatably mounted. There is also the usual supporting roller 8 located rearwardly of the wheel 1 and this is rotatably mounted between the spaced ends of straps 9 and 10 that are fixed, respectively, to the plates 2 and 3.

Fixed to the face plate 3, is a frame structure designed as a supporting element for the cutter and its driving mechanism, presently described. This frame comprises the two leg portions 12—12′ that at their inner ends, are riveted or otherwise fixed, as at 13, to the plate 3 and, at their outer ends, are joined rigidly by a cross bar 12a. Fixed to this cross bar, is a bracket 14 formed from a flat strap of metal. This is rigidly attached to a flattened portion of the cross bar, as at 15, and then is bent horizontally so as to extend inwardly toward the plate 3 and is again bent upwardly at a right angle and, at its upper end, has an aperture 16 therein for receiving the outer end portion of the cutter driving shaft 17. This shaft is revolubly contained in a sleeve 18 which, in turn, is rigidly supported in a boss 19 formed with the plate 3. The sleeve 18 and the shaft 17 extend perpendicularly from the plane of the wheel and the shaft is provided at its inner end with a driving gear 20 that operates in mesh with an internal gear 21 in the ground wheel. This gear 20 would be of the type usually employed in lawn mowers and which would contain a clutch of a suitable type which would permit reverse movement of the mower without driving the shaft 17. At the outer end of the shaft 17, is a bevel gear 22 and this drives a smaller bevel gear 23 through which a vertically disposed shaft 24 is slidably keyed. The shaft 24 extends slidably through a bushing 25 that is mounted in the horizontal portion of the bracket 14, and downwardly through another bushing 26 supported in a vertically adjustable plate or bracket from which the cutter elements are suspended; the latter bracket consisting of a horizontally disposed top portion 27 and a downturned, vertical front portion 27′. A vertically extending, adjusting bar 29 is fixed at its lower end to the plate 27, with its upper portion slidably contained between guide bars 30—30 that are fixed to the inner side of the vertical portion of the bracket 14; these parts being arranged as is shown best in Figure 5a. The adjusting bar 29 is provided with a longitudinally extending slot 29′ through which a locking bolt 32, that is fixed in the bracket 14, extends; there being a nut 32′ on the inner end of the bolt. This bolt may be tightened in the nut when it is so desired, to hold the parts at any certain position of adjustment, however, it is intended that the bolt normally be loosened so as to permit of adjustment of the cutter vertically by manipulation of the handle 7, as will now be described.

In order that the cutter may be vertically adjusted at will by the operator, as he pushes the mower along the ground, I have provided the bell crank 35, which is disposed adjacent the face plate 3 and which has one leg portion pivotally mounted at its rear end on the rear leg 12 of the supporting frame and at its forward end, has a longitudinally extending slot 36 for receiving a stud 37 extending from the adjusting bar 29. The other leg of the bell crank extends upwardly in an arcuately curved manner and, at its upper end, is connected with one end of a rod, or cable, 38 which extends along the handle and is pivotally attached to a lever arm 39 on the handle 7. The construction, as illustrated, provides that rotative movement of the handle bar will cause the bell crank to be raised or lowered accordingly and this movement of the bell crank, acting through the stud 37, will raise or lower the cutter mounting bracket 27.

In a preferred form of construction, the cutter is of the reciprocating type. It comprises a mounting block 42 to which, on its under side, is fixed a cutter guard 43 consisting of a plurality of forwardly tapered teeth 43′. Reciprocally mounted on this guard, is a sickle 44 comprising a plurality of sharpened teeth 44′ that are adapted to coact with the teeth of the guard to effect the cutting operation incident to reciprocation of the sickle member. For reciprocating the sickle. I have provided the crank shaft 50 that is rotatably mounted in the block 42 and which is provided, at its lower end, with a circular head 51 from which a pin 52 extends into a slot 53 formed in the sickle in a direction transversely to its direction of reciprocation. On the upper end of the shaft 50, is a bevel gear 54 and this meshes with an idler gear 55 which, in turn, meshes with a gear 56 that is fixed on the lower end of the vertical driving shaft 24. The gear 55 is revoluble on a stud 57 mounted in the bracket 27′ and the cutter block 42 is supported, so as to permit radial adjustment about this stud, by means of a plate 58 that is fixed to the block and which swings pivotally about the stud. A set screw 60 extends through a slot 61 that is formed in the plate 27′ arcuately about the stud 57. Loosening of this set screw permits adjustment of the cutter block to various positions between the horizontal and vertical and it may be tightened against the plate 27′ to retain the cutter at any position to which it may have been adjusted.

In Figures 6 and 7, I have illustrated an alternative form of construction utilizing the usual revolving type of cutter. In this construction, the cutter blades 65 are supported by opposite end frames 66—66 fixed on a drive shaft 67. The shaft 67 is revoluble in a frame comprising inner and outer end portions 68—68′ and upper and lower cross pieces 69—69; the lower cross piece serving as a mounting for the fixed blade 69′ against which the revolving blades 65 operate in a shearing manner for cutting. The cutter supporting frame is fixed rigidly to a supporting block 70 formed centrally of a cross shaft 71 rotatably adjustable in a frame 72 which, in turn, is vertically adjustable within guides 73—73′ that are fixed to the inner face plate 3 of the mower. The guides 73—73′ are provided with inturned, parallel flanges 74 along their edges which are slidably contained within outwardly facing grooves 75 formed in the cutter mounting frame 72. Vertical adjustment of the frame 72 raises or lowers the cutter elements to different positions, while pivotal adjustment of the cutter frame on the shaft 71 disposes the cutter at various inclined positions between the vertical and the horizontal. The shaft 71 is supported, at its ends, in the frame 72 and is there provided with lock nuts 80 which may be tightened to retain the cutting mechanism at any of the various inclined positions to which it may be adjusted. In this construction, the cutter is driven by means of a belt 82 which operates about a pulley 83 that is fixed to the inner end of shaft 67 and about a pulley 84 alined therewith that is fixed on a drive shaft 85 mounted in a bearing sleeve 86 fixed in the face plate 3. On the inner end of the shaft 85, is a gear wheel 87 which operates in mesh with the internal gear 21 of the ground wheel 1.

For the purpose of adjusting the frame 72 to different positions, I have provided a bell crank 90 of the type shown in Figure 8, which is pivotally mounted at one end about the bearing 86 and at its other end has a slot 92 for receiving a stud 93 that is fixed to the frame 72. The cable from the handle 7 attaches also to the bell crank in such manner that rotation of the handle effects the raising or lowering of the frame 72 and a consequent raising or lowering of the cutter elements.

In Figures 2 and 3, I have illustrated alternative forms of cutters to be used in place of the reciprocating cutter. The device as shown in Figure 2 comprises a horizontal guard frame 100 fastened to a central block 101 which may be fixed to the bracket 27 in place of the block 42 so as to receive the shaft 50 therethrough and a cutter blade 102 is cooperatively arranged with the guard and adapted to be fixed to the lower end of the shaft 50 so that rotation of the shaft through the gear 54 will cause the blade 102 to revolve in shearing relation to the cutter guard.

In Figure 3 is another type of cutter 105 adapted to be fixed to the lower end of the shaft 50. When this type of cutter is used, no guard is necessary.

Assuming the device to be constructed as illustrated in Figure 1, it is readily apparent that rotation of the wheel 1 incident to pushing the mower along the ground, causes rotation of the shaft 17 and, through the gears 22 and 23, effects rotation of the shaft 24 and this, through the gears 56, 55 and 54, effects rotation of the crank shaft 50 and a consequent reciprocal action of the sickle 44. Vertical adjustment of the cutter elements is provided for through rotation of the handle 7 which operates through the connecting rod 38 and bell crank 35 to raise and lower the cutter elements in accordance with the direction of rotation of the handle. If it is desired to fix the cutter at any certain position of vertical adjustment, this is done by tightening the set screw 60. If it is desired to adjust the cutter to any certain angular position, this is done by loosening the set screw 60 and then swinging the cutter elements to the desired position and again tightening the set screw.

It is quite apparent that with the device so constructed cutting may be done close up to sidewalks and trees or shrubs, where the ordinary type of mower cannot be used, and that it is also possible to cut at any inclined position which is sometimes desired along the edges of sidewalks or along paths.

It is readily apparent that various details of construction could be changed without departing from the spirit of the invention and, for this reason, it is not desired to limit the claims only to the specific details illustrated.

Having thus described my invention, what I claim as new therein and desire to secure by Letters Patent, is:

1. A lawn mower comprising a frame having guides thereon, a single ground wheel revolubly mounted on and functionally supporting the frame, a cutter mechanism supported by the frame and vertically adjustable in the guides, and means for retaining the cutter mechanism at different positions of adjustment.

2. A lawn mower comprising a frame, a single ground wheel revolubly mounted on and functionally supporting the frame, vertical guides on the frame, a cutter support movable along the guides, a cutter mechanism, a mounting therefor, and a horizontal pivot connecting the mounting with the cutter support and about which the cutter mechanism may be adjusted to various angular positions between horizontal and vertical planes, said cutter support being adjustable in the guides to move the cutter mechanism to different positions between planes above and below the plane of the surface on which the ground wheel travels.

3. A lawn mower comprising a frame, a single ground wheel revolubly mounted on and functionally supporting the frame, a drive shaft mounted in the frame and having an operative driving connection at its inner end with the wheel, a cutter mechanism mounted on the frame and bodily adjustable in a vertical direction and mechanism maintaining operative driving connection between the cutter mechanism and the outer end of the drive shaft.

4. A lawn mower comprising a frame structure, a ground wheel rotatably mounted at one side of the frame and functionally supporting it, a drive shaft mounted in the frame and having a geared driving connection at one end with the wheel, vertical guides on the frame, a cutter support vertically adjustable in the guides, means for maintaining different adjustments, cutter mechanism pivotally mounted on the said support, for adjustment to different angular positions between vertical and horizontal, and a cutter driving shaft having geared connection with the drive shaft and maintaining said connection for all positions of adjustment.

5. In a lawn mower of the character described, a driving wheel, a frame member supported by the said wheel, a pole attached to the frame, a handle bar mounted on the pole, a cutter mechanism supported from the frame for vertical adjustment with respect thereto and having an operative driving connection with the ground wheel and means operable from the handle bar for effecting the vertical adjustment of the cutter mechanism.

6. In a lawn mower of the character described, a driving wheel, a frame supported by the wheel, a pole attached to the frame, a cutter mechanism having operative driving connection with the driving gear and mounted on the frame for vertical adjustment with respect thereto; said pole having a rotatable handle bar and means connecting the said handle bar with the cutter mechanism for effecting adjustment of the latter by rotative movement of the handle bar.

7. In a lawn mower of the character described, a driving wheel, a frame supported by the wheel, a pole attached to the frame and having a rotatably mounted handle bar at its end, a cutter mechanism supported from the frame at the side of the wheel for vertical adjustment with respect thereto, a bell crank pivotally mounted on the frame having an adjusting connection with the cutter mechanism, a lever fixed to the rotatable handle bar and a connection between the said lever and bell crank whereby rotation of the handle bar actuates the bell crank to effect vertical adjustment of the cutter mechanism.

8. In a lawn mower of the character described, a driving wheel, a frame member supported by the wheel, a pole attached to the frame, a handle bar mounted by the pole, a cutter mechanism supported from the frame for vertical adjustment with respect thereto and having an operative driving connection with the driving wheel, means operable from the handle bar for effecting the vertical adjustment of the cutter mechanism and means for securing the cutter at any of its various positions of adjustment.

9. In a lawn mower of the character described, a supporting and driving wheel, a frame supported by the wheel adjacent a side of the latter, a drive shaft rotatably mounted by the frame and having a driving connection at one end with the wheel and having a gear fixed to its other end, a cutter mechanism supported by the frame and adjustable vertically with respect thereto, a cutter driving shaft vertically movable with the cutter mechanism and a driving gear slidably keyed on the shaft and meshing with the first mentioned gear to maintain a driving connection for the different positions of adjustment of the cutter mechanism.

10. In a lawn mower of the character described, a driving wheel, face plates disposed at opposite sides of the driving wheel and supported from the latter, a handle secured to the face plates, a ground roller supported from the face plates rearwardly of the driving wheel, a frame structure fixed to one of the face plates, a bracket attached to the said frame mechanism for vertical adjustment with respect thereto, a cutter mechanism supported from the vertically adjustable bracket and adapted to be tilted to various angular positions with respect to the wheel, and means for securing it at different positions of angular adjustment, means for adjusting the bracket vertically, means whereby it may be secured at different positions of vertical adjustment and a driving connection between the cutter mechanism and ground wheel that maintains its operativeness for the various positions of adjustment.

11. In a lawn mower of the character described, a driving wheel, a frame structure supported by the wheel, a handle attached to the frame, a shaft mounted by the frame and having a geared driving connection with the driving wheel, a gear fixed at the outer end of said shaft, a bracket supported by the frame and vertically adjustable therein, a vertical shaft revolubly carried by the said bracket, a gear slidably keyed on said shaft in mesh with the first mentioned gear, a gear fixed at the lower end of the said vertical shaft, a cutter mechanism supported by the said bracket for vertical adjustment therewith and pivotally adjustable to different angular positions between the vertical and horizontal, a driving gear for the said cutter mechanism and an idler gear supported by the bracket and operatively connecting the gear at the lower end of the vertical shaft and the driving gear of the cutter mechanism and which maintains the driving connection for the various angular positions of the cutter mechanism.

Signed at Seattle, Washington, this 27th day of November, 1928.

ADRIAN J. GILARDI.